March 27, 1928.

F. A. CALKINS 1,664,158

FASTENER FOR TIRE CHAINS

Filed June 23, 1926

INVENTOR
Frederic A. Calkins
BY
H. G. Manning
ATTORNEY

Patented Mar. 27, 1928.

1,664,158

UNITED STATES PATENT OFFICE.

FREDERIC A. CALKINS, OF WATERBURY, CONNECTICUT.

FASTENER FOR TIRE CHAINS.

Application filed June 23, 1926. Serial No. 117,972.

This invention relates to non-skid chains for automobile tires, and more particularly to a detachable fastener device for connecting and tightening the ends of such a chain.

One object of this invention is to provide a detachable fastener device of the above nature which will be unlikely to become unfastened under the most severe conditions met with in use.

A further object is to provide a device of the above nature comprising a pair of links which are pivoted together, one of said links being adapted to carry the tension of the tire chain, while the other link serves as a detachable locking device.

A further object is to provide a device of this nature which will be simple in construction, inexpensive to manufacture, easy to manipulate, ornamental in appearance, and very efficient and durable in use.

With these and other objects in view, there have been illustrated on the accompanying drawings, several forms in which the invention may be conveniently embodied in practice.

Figure 1:
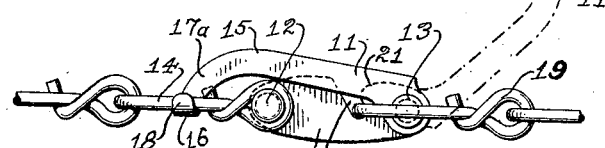
Fig. 1 is a side view of the preferred form of the invention showing the locking link in locked position.
Figure 2:
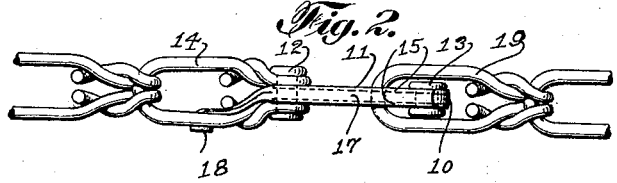
Fig. 2 is a top view of the same.

Referring now to the drawings in which like reference numerals denote corresponding parts throughout the several views, the first form of the invention shown in Figs. 1 and 2 comprises a pair of links 10 and 11, the link 10 being preferably constructed from solid stock and made substantially oval in shape. The link 10 will hereinafter be termed the "tension link" as it is designed to bear the tensional stress of the chain when the fastener is in locked position. The tension link 10 is provided at its ends with circular apertures for the reception of rivets 12 and 13. The rivet 12 is adapted to pivotally connect the tension link 10 to the wire end link 14 of one side of the chain, said rivet 12 being headed over at both of its extremities to permanently secure said link 14 in position.

The rivet 13 is also headed over at its extremities upon a pair of parallel wing members 15 of the link 11. The link 11 will hereinafter be designated as the "locking link," inasmuch as it is adapted to be swung over about the rivet 13 parallel to the tension link 10. In this position the extremity 16 of the locking link will project down through the wire loop 14 and will be seated underneath one side thereof for detachably locking the fastener in position.

The locking link 11 is preferably constructed from flat sheet metal and has its side wings 15 connected by a top bridge section 17. The ends of the wing members 15 opposite from the rivet end 13 are inclined downwardly at 17ª and bent together in flat contact as viewed in Fig. 2 to comprise the extremity 16 previously mentioned.

In order to prevent the locking link 11 from accidentally being moved out of locking position, the tip of the extremity 16 is bent outwardly and upwardly at 18 to fit around the wire loop 14. The locking link 11 will be securely held in this position by the resistance of the metal to the lateral bending which is necessary to open the locking link. Whenever it is desired to disconnect the sides of the chain, however, it will only be necessary for the operator to push the tip 18 downwardly and inwardly, and swing the locking link 11 upwardly about its pivot 13. The chain end link 19 may then be readily lifted out of the inclined slot or recess 20 in the edge of the tension member 10.

The recess 20 is inclined rearwardly and has a rounded forward edge 21.

In operation, whenever it is desired to lock the chain ends together, the locking link 11 will be passed up through the end link 19 and swung from the position shown in dotted lines to the position shown in full lines in Fig. 1, said end link 19 being thereby pulled to the left to tighten the chain, and causing it to ride over the rounded forward edge 21 to drop into the slot 20 and be tightly held in position.

It will also be noted that when the fastening device is in its locked position, as shown in Fig. 1, the tension of the chain will not be transmitted to the locking link 11 but will be taken up entirely by the tension link 10. This is due to the fact that the base of the slot 20 is below the line joining the centers of the two rivets 12 and 13. It will thus be seen that there will be no tendency for the locking link to open up under any of the conditions commonly met with in use.

While only one fastening member is illustrated on the drawing, it will be understood that in practice two of them are employed for each tire chain, one fastener being located on each side of the tire.

Figure 3:
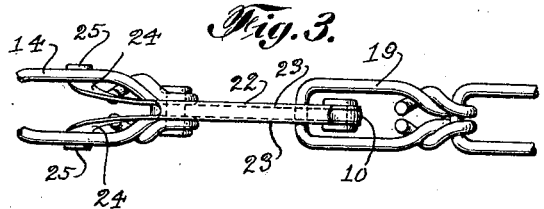
Fig. 3 is a top view of a modified form of the invention.

Referring now to the modified form of the invention shown in Fig. 3, the construction of the tension link is identical with that of the forms shown in Figs. 1 and 2. The locking link 22 in this instance, however, is of a somewhat different construction. The locking link 22 has its wing sections 23 provided with a pair of oppositely extending lateral fork members 24, each of which projects downwardly through the wire link 14, and then outwardly and upwardly at 25 to engage the outer edges of the parallel sides of said link 14.

It will be understood from this construction, that when the fastener shown in Fig. 3 is in locked position, the resiliency af the fork sections 24 will normally hold the extremities 25 outwardly and tightly engaged against the sides of the link 14 and will thereby prevent the locking link 11 from becoming accidentally disengaged.

Figure 4:
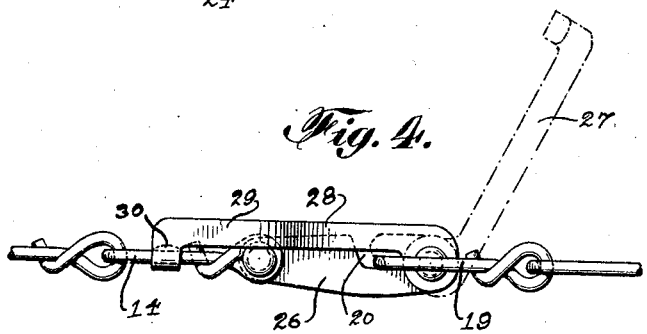
Figs. 4 and 5 are side and top views, respectively, of a third form of the invention.
Figure 5:
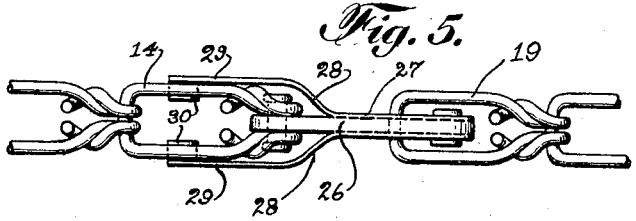

In Figs. 4 and 5 a third form of the invention is illustrated. In this form of the invention the tension link 26 is substantially identical with the tension link 10 of the first two forms of the invention except that it has its top edge flat instead of round. The locking member 27 in this modification is not curved downwardly, but lies in a single plane and has its wing members 28 bent outwardly in opposite directions to provide a pair of parallel fork extremities 29 which are adapted to lie outside of the sides of the wire link 14. The tips of the fork extremities 29 are bent inwardly and upwardly at 30 so that they will embrace the wire link 14 from the outside.

In the operation of the invention shown in Figs. 4 and 5, when it is desired to lock the fastener in place upon the ends of the chain, the locking link 27 will first be passed up through the chain end link 19, and then swung from the position shown in dotted lines to the position shown in full lines in Fig. 4. At the same time the operator will press the side arms 30 together slightly in order to bring them into alinement with the sides of the link 14. The locking link 27 will then be pulled upwardly a short distance to engage the sides of the link 14. The natural resiliency of the fork arms 29 will then tend to hold the extremities 30 tightly in place and prevent the locking links 27 from becoming accidentally disengaged.

One advantage of the present invention is that no additional springs of any sort are required for holding the links of the fastening member in locked position, the natural resiliency of the locking links themselves being sufficient for this purpose.

While there have been disclosed in this specification several forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a detachable fastener for connecting the end links of a tire chain, a tension link pivoted to one of said chain end links, a locking link pivoted to said tension link, said tension link having a recess for receiving the other chain end link; said locking link comprising a flat bridge section and a pair of depending side wings, said wings embracing the opposite sides of said tension member and serving to lock said other chain end link in position, said side wings when in locked position extending beyond the end of said tension member and having means to engage said first-named chain end link for holding said locking link in locked position.

2. In a detachable fastener for connecting the end links of a tire chain, a tension link pivoted to one of said chain end links, a locking link pivoted to said tension link, said tension link having a recess for receiving the other chain end link, said locking link comprising a flat bridge section and a pair of depending side wings, said wings embracing the opposite sides of said tension member and serving to lock said other chain end link in position, said side wings when in locked position extending beyond the end of said tension member and being bent into contact to form a hook to engage said first-named chain end link for holding said locking link in locked position.

In testimony whereof, I have affixed my signature to this specification.

FREDERIC A. CALKINS.